United States Patent [19]
Esser

[11] Patent Number: 5,240,360
[45] Date of Patent: Aug. 31, 1993

[54] MACHINE TOOL WITH EXCHANGEABLE MACHINING HEADS

[76] Inventor: Karl-Josef Esser, Pauenstrasse 89, D-4050 Mönchengladbach 5, Fed. Rep. of Germany

[21] Appl. No.: 849,884

[22] Filed: Mar. 12, 1992

[30] Foreign Application Priority Data

Mar. 13, 1991 [DE] Fed. Rep. of Germany ....... 4108038

[51] Int. Cl.$^5$ .................................................. B23C 1/06
[52] U.S. Cl. ...................................... 409/230; 408/238; 409/231
[58] Field of Search .............. 483/13; 29/57; 409/230, 409/232, 233, 234, 231; 408/239 A, 239 R, 238

[56] References Cited

U.S. PATENT DOCUMENTS

| | | | |
|---|---|---|---|
| 3,757,637 | 9/1973 | Eich | 409/233 |
| 4,548,532 | 10/1985 | Watanabe et al. | 409/233 |
| 4,599,023 | 7/1986 | Poincenot | 409/233 |

FOREIGN PATENT DOCUMENTS

| | | |
|---|---|---|
| 2212875 | 2/1974 | Fed. Rep. of Germany. |
| 2230144 | 8/1979 | Fed. Rep. of Germany. |

*Primary Examiner*—William Briggs
*Attorney, Agent, or Firm*—Michael G. Marinangeli; Thomas Gallagher

[57] ABSTRACT

Machine tool with a driving spindle held in a carrier, an exchangeable machining head that can be coupled with the carrier and a tool spindle in the machining head that can be coupled with the driving spindle and adjustment and locking means on the carrier for locking the machining head onto the carrier. The machining head can be withdrawn from a magazine for machining heads by means of said adjustment and locking means and it can be coupled with and locked onto the machine tool and, after releasing, it can be brought into any desired angular position relative to the machine tool and locked again.

13 Claims, 5 Drawing Sheets

MACHINE TOOL WITH EXCHANGEABLE MACHINING HEADS

The invention relates to a machine tool with a machining spindle and machining heads that are coupleable with and exchangeable in the machining spindle.

Such machine tools are known and allow, in addition to the usual machining, the machining of workpieces inserted into the machining spindle by means of applied and exchangeable machining heads. Such machining heads may consist of angular cutter heads, universal cutter heads or planet disks. In known machine tools of this kind the machining heads are arranged relatively complex, because they comprise all devices for machining a workpiece by such machining heads. This includes advancing devices as well as angular adjustment means for the tools in the machining heads in order to adjust them true to angle with respect to the workpieces to be processed.

The invention is based on the problem to be solved in that a machine tool with exchangeable machining heads is to be created that is provided with a simple arrangement, that allows establishing a safe and quick connection between a machining head and the machine tool and using simplified machining heads.

Starting out from the above problem to be solved, it is proposed in a machine tool of the type mentioned above which comprises a driving spindle held in a carrier, an exchangeable machining head coupleable with the carrier and a tool spindle in the machining head coupleable with the driving spindle, that in accordance with the invention adjustment and locking means are arranged on the carrier for receiving and locking the machining head onto the carrier. The locking means may preferably consist of inwardly oriented bayonet claws in the machining head and of a rotatable and axially displaceable bayonet ring with outwardly oriented bayonet claws in the carrier, whereby the adjustment means cooperate with the bayonet ring. The connection between the machining head and the carrier of the machine tool may take place in such a way that the machining head and the carrier are pushed together with the bayonet claws being set to form a gap and that thereafter the bayonet ring is rotated in such a way that the bayonet claws lie behind one another. Thereafter the bayonet ring may be displaced axially and thus grips the machining head onto the carrier of the machine tool. The coupling of the driving spindle in the carrier with the tool spindle in the machining head occurs simultaneously.

If the machining head is situated in a magazine for machining heads, the usually axially displaceable carrier of the machine tool is moved towards the machining head, so that the bayonet ring with bayonet claws that are set to form a gap are moved so far into the machining head that the bayonet claws of the bayonet ring can be brought behind the bayonet claws of the machining head by way of rotation. After locking the machining head onto the carrier of the machine tool, the machining head can be withdrawn from the magazine by reverse movement of the carrier. In very large machine tools with machining heads that are very heavy and have large dimensions, such a machining head can also be moved towards the carrier and brought into position with the help of a crane. In this case the axial movement of the carrier for coupling and locking of the machining head can be avoided.

Preferably, the adjustment means may consist of the driving spindle or one or several hydraulic or pneumatic piston-cylinder units. The driving spindle causes the rotation of the bayonet ring by means of suitable coupling means and the hydraulic or pneumatic cylinder-piston unit causes the axial displacement of the bayonet ring and thus the gripping of the machining head onto the carrier of the machine tool.

The hydraulic or pneumatic piston-cylinder unit can be arranged particularly simply if it is arranged as a sealed annular piston that is guided in the carrier and moves coaxial to the driving spindle. Such an annular piston can be simply arranged as a single-acting piston if it is movable by means of springs in the direction of the driving spindle end and by means of pressure in the opposite direction, or vice-versa.

Since the annular piston causes the axial displacement of the bayonet ring while a rotation of the bayonet ring can be achieved by means of the driving spindle, the bayonet ring may be coupled with the annular piston either rotatably or immovably.

As, on the one hand, the bayonet ring should be torsionally rigidly coupleable and, on the other hand, there must be the possibility that the driving spindle can rotate freely with respect to the bayonet ring, the bayonet ring may be provided with at least one projection that is radially inwardly oriented and engages optionally in a ring groove or an axial groove of the driving spindle.

Hence, the bayonet ring can be axially displaced relative to the driving spindle by means of the annular piston, so that the radial projection either engages in the ring groove so as to allow the driving spindle to be able to rotate freely in this position with respect to the bayonet ring or it engages in the axial groove of the driving spindle to form a rotating connection with the driving spindle.

This rotating connection between the bayonet ring and the driving spindle allows the bayonet ring, for the purpose of being coupled with a machining head, to be set to form a gap with the bayonet claws, so that the bayonet ring can be moved behind the bayonet claws of the machining head into the machining head. Thereafter the bayonet ring can be further rotated by means of the driving spindle in such a way that the teeth of the bayonet claws sit close to one another and thus allow the locking through the axial displacement of the bayonet ring.

The driving connection between the bayonet ring and the driving spindle serves another purpose, i.e., to turn the machining head to a desired angular position with respect to the machine tool. For this purpose the bayonet ring may comprise at least one axially oriented projection that is insertable into an axial groove in the zone of the bayonet claws of the machining head. This projection reaches the axial groove in the zone of the bayonet claws whenever the tensioning process is carried out. After releasing the locking of the machining head with respect to the carrier of the machine tool, the machining head is freely rotatable with respect to the carrier of the machine tool and can be brought into the desired angular position relative to the carrier of the machine tool.

In order to provide the machining head with the simplest possible arrangement, an adapter ring may be screwed onto the surface of the machining head that shows towards the carrier of the machine tools. The adapter ring comprises the bayonet claws and other devices that facilitate the coupling of the machining head with the carrier of the machine tool. Thus, the adapter ring and the carrier may preferably comprise cooperating centering cones. In addition, the machining head and the carrier may comprise cooperating radial teeth that ensure the locking after the interlocking between the machining head and the carrier of the machine tool.

To ensure the easy separation of the machining head from the carrier of the machine tool after releasing the locking and to carry out the relative rotation of the machining head with respect to the carrier of the machine tool after the release, spring elements may be provided between the carrier and the machining head. The spring elements ensure that during the release the axial projection on the bayonet ring remains in the axial groove in the zone of the bayonet claws of the machining head as long as the machining head does not hit against a rigid stop during the axial movement caused by the release movement of the annular piston. Such a rigid stop is, for example, provided if the machining head is inserted into the magazine for the machining heads and moves against a stop provided in said magazine.

The same purpose is achieved by an axially displaceable spring-loaded clutch disk that is arranged on the tool spindle, torsionally rigidly coupleable with the tool spindle and coupleable with the driving spindle.

Power docking devices may be provided on the faces of the carrier of the machine tool and the machining head that show towards each other. Such devices may, for example, consist of automatic clutches for hydraulic or pneumatic tubes or for electric contacts. In this way, control commands and the power required for carrying out said control commands can automatically be coupled with the machining head.

The invention is outlined below in greater detail by reference to an embodiment shown in the drawings, in which.

Figure 1:
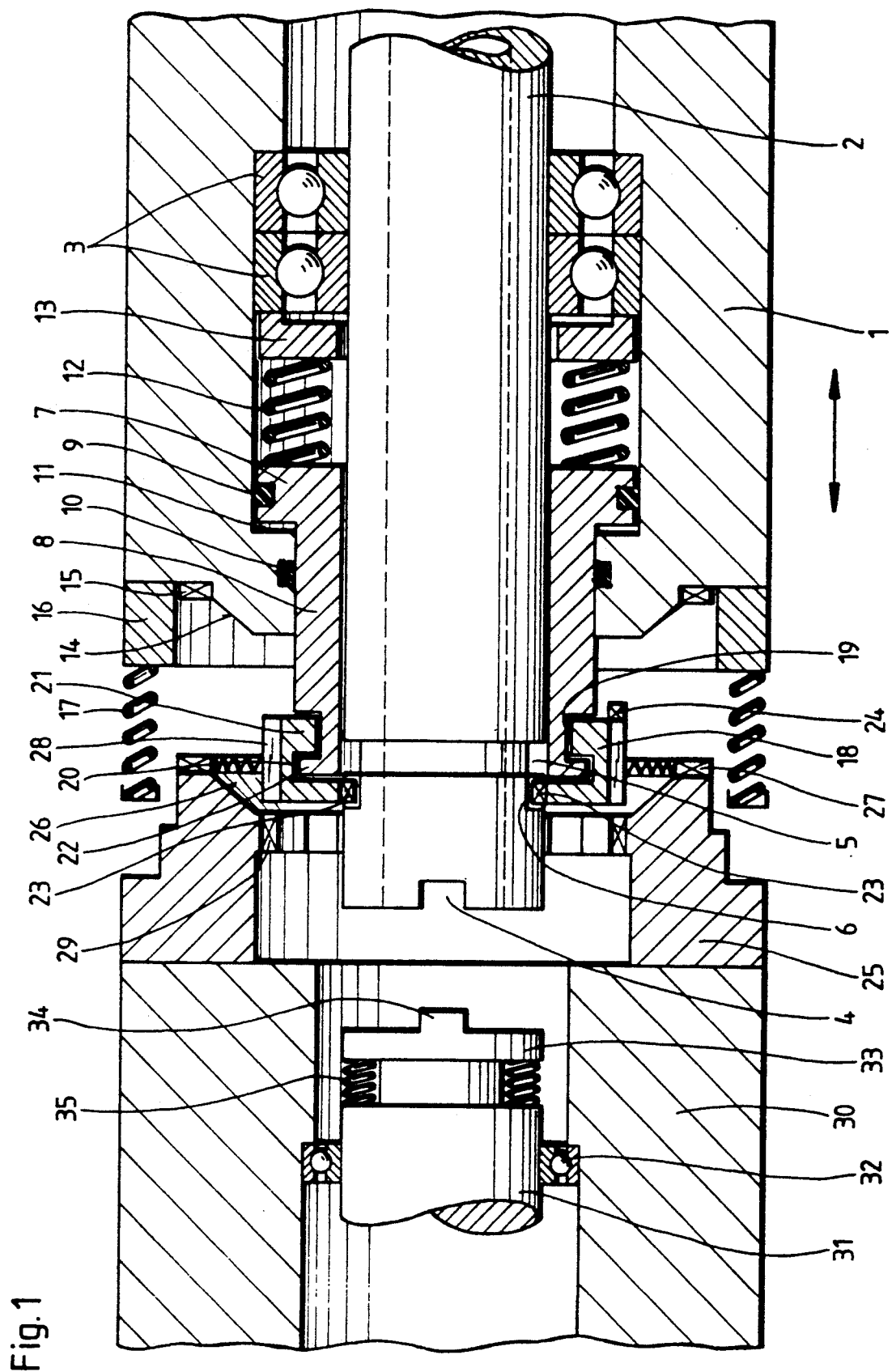
FIG. 1 shows a schematic sectional view through a part of the machining head and the carrier of the machine tool with the driving spindle being situated immediately before the coupling.

A carrier in the form of a square girder 1 is held axially displaceable in the machine tool in a manner not explained herein. A driving spindle 2 is rotatably and axially non-displaceably held in the girder 1 by means of rolling bearings 3. The driving spindle 2 may be tipped with a machining tool at its free end and can be directly used for machining a workpiece. In the shown embodiment the driving spindle 2 is used for driving a tool spindle 31 with a machining head 30 that is coupleable with the carrier 1. The machining head 30 is not shown in greater detail and may be provided as angular cutter heads, universal cutter heads or planet disks.

At the free end of the driving spindle 2 there is a lateral groove 4 which, as will be explained below in greater detail, is used for coupling with the tool spindle 31.

In the zone of the free end of the driving spindle 2 there are a ring groove 5 and at least one axial groove 6 starting out from said ring groove 5.

An annular piston 7 with a tube-like shaft 8 is sealed by means of stuffings 9, 10 and it is guided coaxially towards the driving spindle 2 in the girder 1. A ring chamber 11 that can be supplied with a pressure medium is disposed between the girder and the annular piston 7. The annular piston 7 is of the single-action type and moves to the right against the action of pressure springs 12 if the ring chamber 11 is fed with a pressure medium and moves to the left following the action of the pressure springs 12 if the ring chamber 11 is relieved from the pressure medium. The pressure springs rest on an outer ring of the rolling bearings 3 via a pressure ring 13.

A centering cone 14 is disposed on the front side of girder 1, which cone changes into a radial toothing 15 that may be arranged as a serration. Instead of the radial toothing 15 there may be provided on the front side of girder 1 one or several radial keys or grooves that cooperate with the respective radial grooves or radial keys in the machining head 30.

A protective ring 16 is arranged concentrically to the centering cone 14 and the radial toothing 15, which simultaneously serves as a carrier for the pressure spring arrangement 17. The purpose of said pressure spring arrangement 17 will be explained below in greater detail.

A bayonet ring 18 can be rotated with shaft 8 of annular piston 7. However, it is coupled axially non-displaceably. For this purpose shaft 8 and the bayonet ring 18 are each provided with a ring groove 19, 20 into which an inwardly oriented radial circumferential projection 21 or an outwardly oriented axial circumferential projection 22 engage. Bayonet claws 28 that are radially outwardly oriented are arranged on the outer circumference of the bayonet ring 18. Furthermore, at least one radially inwardly oriented nose 23 is arranged on the front face of the bayonet ring 18. In the shown embodiment, however, there are two diametrically opposite radial noses 23 which are either made in one piece with the bayonet ring 18 or screwed onto the bayonet ring 18.

Furthermore, bayonet ring 18 is provided with at least one axially extending nose 24 which may either be made in one piece with a bayonet claw on the bayonet ring 18 or screwed onto the bayonet claw.

An adapter ring 25 is screwed onto the machining head 30, which ring is provided with a centering cone 26 that cooperates with the centering cone 14 on the girder 1 in the locked position. A radial toothing 27 is provided on the front face of the adapter ring 27 and it cooperates in the locked position with the radial toothing 15 on the girder 1. In addition, the adapter ring 25 is provided with radially inwardly oriented bayonet claws 29 that cooperate with the radially outwardly oriented bayonet claws 28 on the adapter ring 18. In the zone of a radially inwardly oriented bayonet claw of bayonet claws 29 on the adapter ring 25 there is an axial groove 37 that cooperates with the axial nose on the bayonet ring 18.

The tool spindle 31 is held in the machining head 30 by means of rolling bearings of which only rolling bearing 32 is shown. A clutch disk 33 is axially displaceably, but torsionally rigidly disposed on the free end of tool spindle 31. The clutch disk 33 is displaced by means of pressure springs 35 and comprises a cotter 34 that cooperates with the transversal groove 4 in the driving spindle 2.

Power docking devices 38 are provided on the front faces of the machining head 30 and the girder 1, which devices are disposed in the corners of the squarely formed machining head 30 and the square girder 1. Said power docking devices 38 are only shown schematically and may consist of automatic clutches for pressure medium pipes and/or plug contacts for electric leads for transmission of power or control signals.

Figure 2:
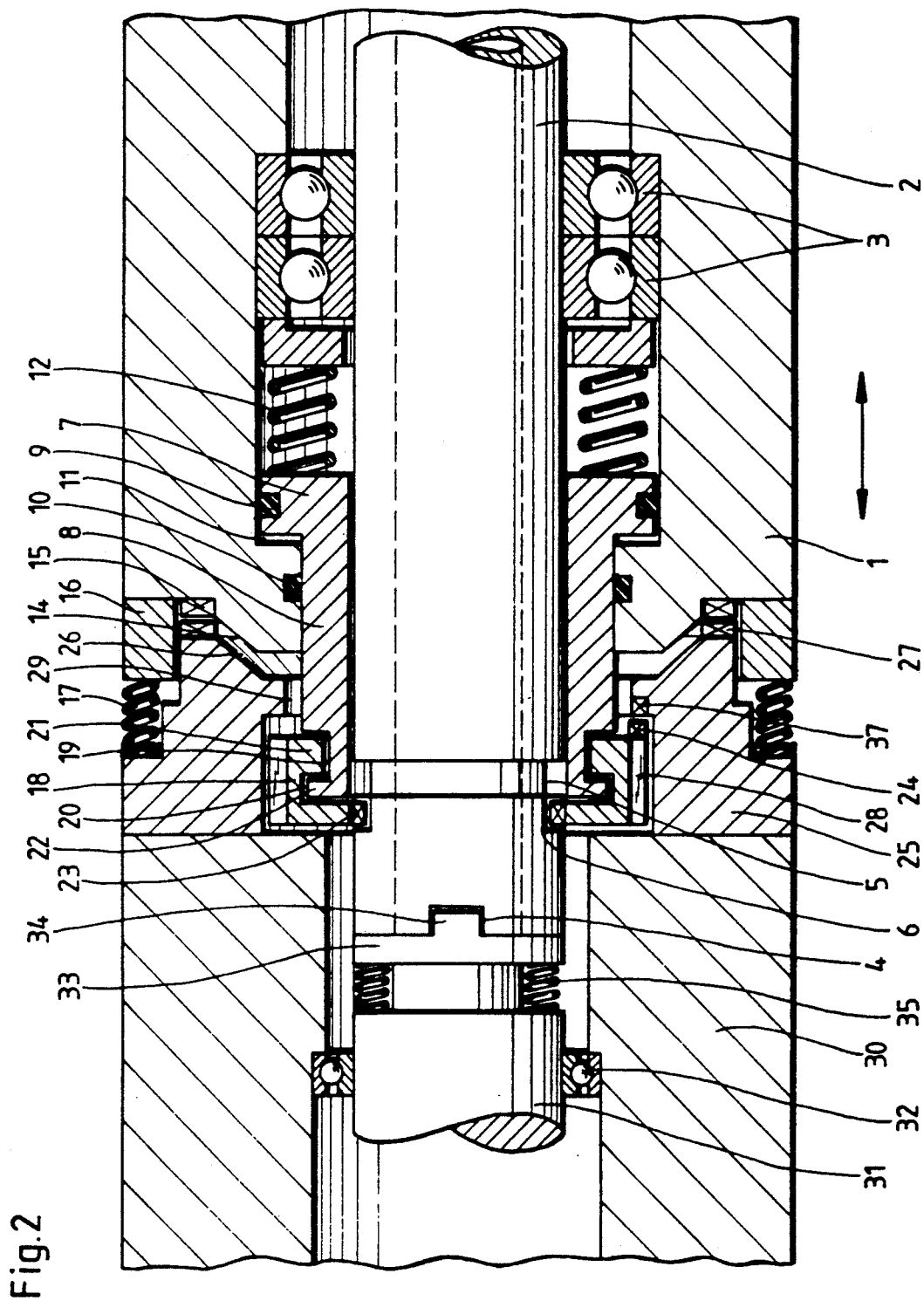
FIG. 2 shows the same view after the coupling, but before the locking.

In order to couple a machining head 30 with the machine tool it is assumed that the machining head 30 is situated in a magazine for machining heads and rests on a stop with its end that is not shown in the drawings. The girder 1 with the annular piston 7 and the bayonet ring 18 in the shown position are advanced, together with the spindle 2, in the direction of the adapter ring 25. In the shown position, which can be set by the respective controlling means in the machine tool and a predefinable indexing, the bayonet claws 28 on the bayonet ring 18 and the bayonet claws 29 on the adapter ring 25 are situated gap to gap, so that the spindle 2 with the bayonet ring 18 can be advanced to the axial position as is shown in FIG. 2.

This leads to the coupling of the spindle 2 with the tool spindle 31 through the clutch disk 33 whose cotter 34 engages with the transversal groove 4 of the driving spindle 2. In the position as shown in FIG. 2 the spindle 2 with the bayonet ring 18 has already been rotated in such a way that now the bayonet claws 28, 29 are claw to claw in opposition to one another. The rotation of the bayonet ring 18 takes place by means of the driving spindle 2, because the radial noses 23 on the bayonet ring 18 are situated in the axial grooves 6 in the driving spindle 2 and thus have a driving connection with the driving spindle 2. The rotation of the driving spindle 2 takes place by means of suitable indexing, so that the rotation is only carried out as far as it is required to set the bayonet claws 28, 29 claw to claw opposite of one another. In this position the axial nose 24 is situated opposite of axial groove 37 in a bayonet claw of the bayonet claws 29 of the adapter ring 25.

During the mating of the girder 1 and the machining head 30 the pressure springs 17 on the protective ring 16 and the pressure springs 35 between the tools spindle 31 and the clutch disk 33 are compressed up to a certain extent.

In order to lock the machining head 30 with the girder 1, the annular piston 7 is moved to the right by feeding the ring chamber 11 with a pressure medium, which pulls the bayonet ring 18 axially to the right side. Simultaneously, the bayonet ring 18 also pulls the adapter ring 25 and the machining head 30 to the right until the centering cones 14, 26 touch each other and the radial toothings 15, 27 mate. The machining head 30 is now unrotatably connected to the girder 1. At the same time, the radial noses 23 on the bayonet ring 18 have moved from the axial groove 6 to the ring groove 5, so that the driving shaft 2 can rotate freely and thus causes the tools spindle 31 to rotate in order to machine a workpiece by means of a tool not shown in the drawing.

Figure 4:
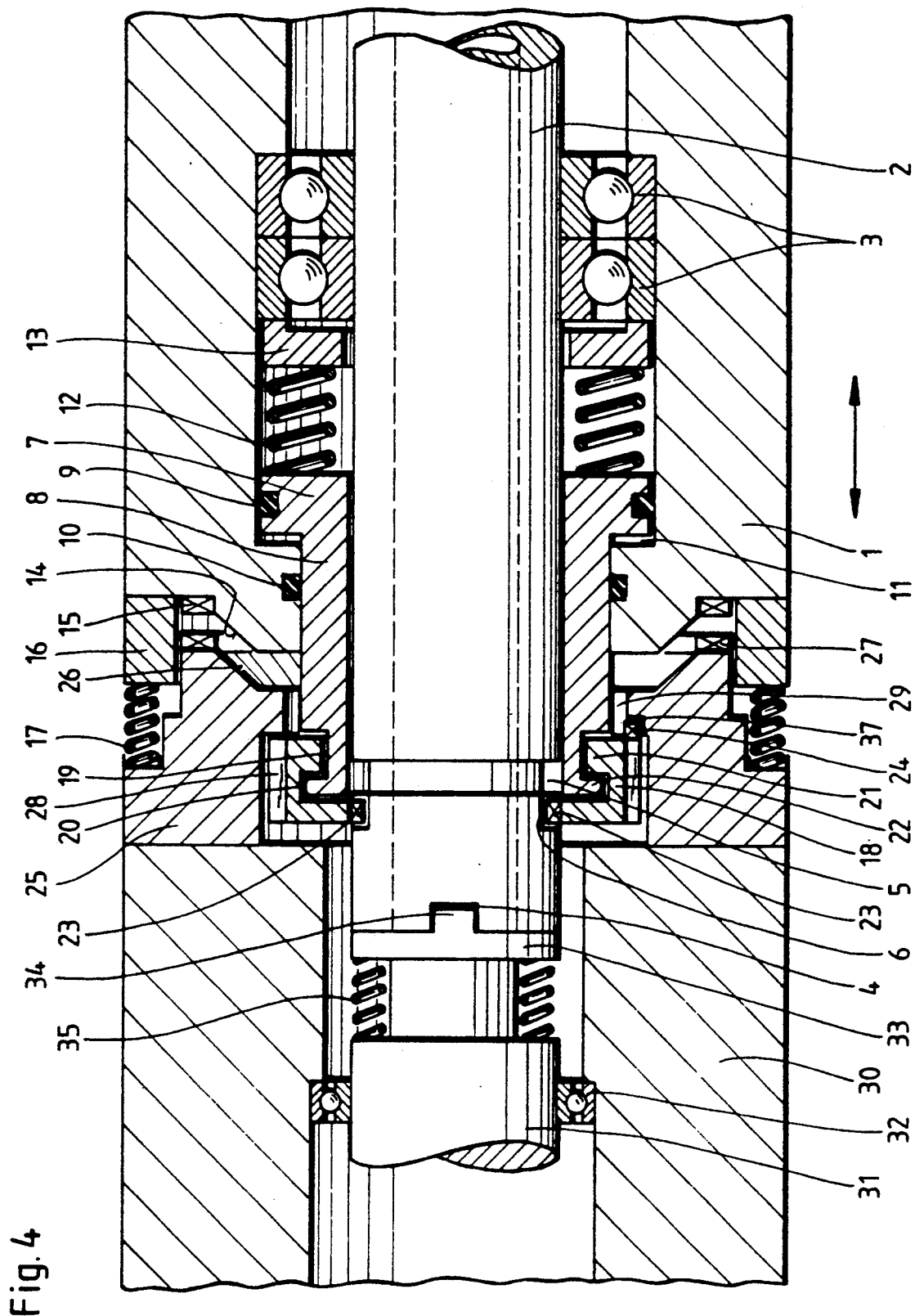
FIG. 4 shows the same view in the coupled, but released condition.
Figure 6:
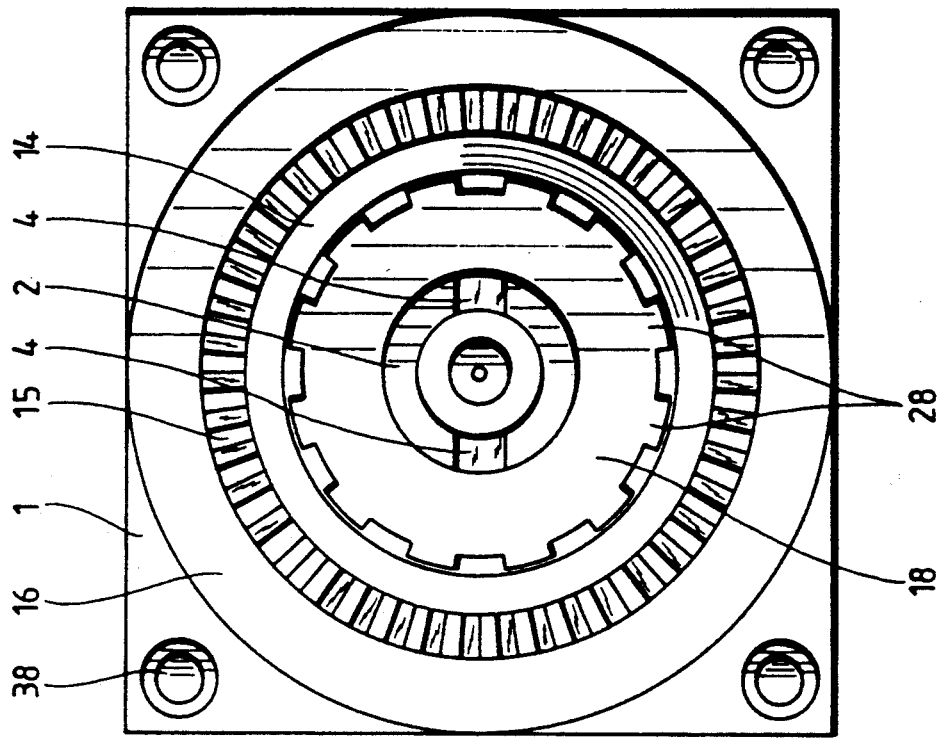
FIG. 6 shows a frontal view of the carrier of the machining tool.
Figure 5:
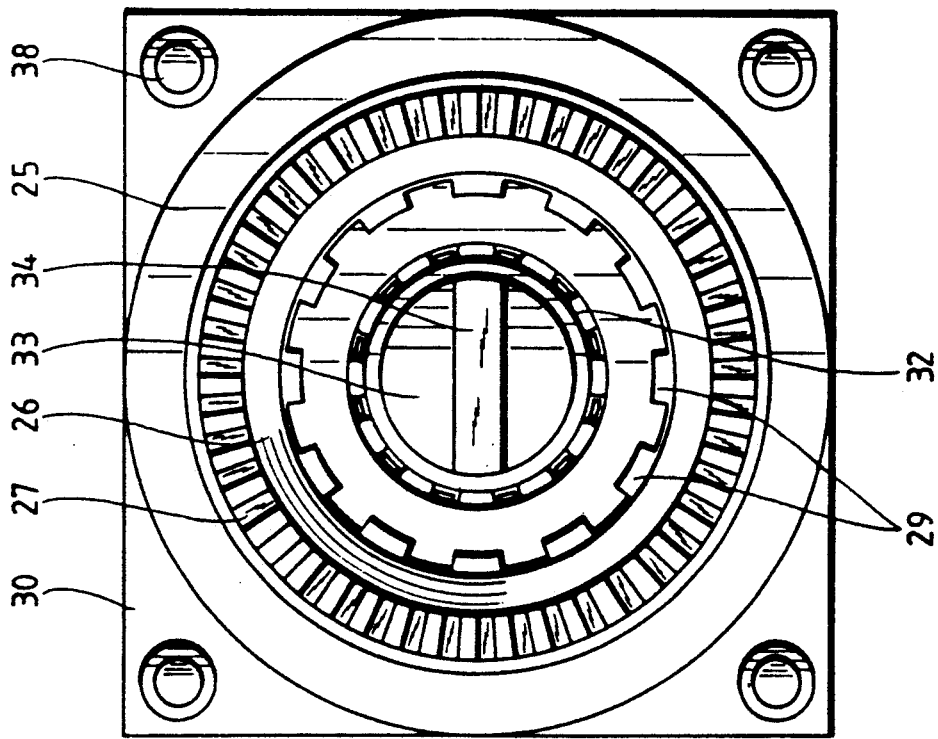
FIG. 5 shows a frontal view of the machining head.

In order to release the lock and exchange a machining head 30, the supply of pressure medium to the ring chamber 11 is interrupted and, under the influence of the pressure springs 12, the piston 7 with its shaft 9 arrives at the position that is shown in FIG. 4. The pressure springs 17 simultaneously displace the machining head 30 with the adapter ring 25 to the extent that the radial toothings 15, 27 no longer mate. However, the axial nose 24 remains in engagement with the axial groove 37 while the radial noses 23 again mate with the axial grooves 6. In this position there is a rotational connection between the driving spindle 2 and the machining head 30 through the radial noses 23 in the axial grooves 6 and the axial nose 24 in the axial groove 37. In this position the machining head 30 can be brought into any random angular position relative to the girder 1, which can be carried out in very small angular steps if radial toothings 15, 27 are used. If only a rotation at 90° is required between the machining head 30 and the girder 1, it is sufficient to provide, instead of radial toothings 15, 27, a radially arranged key and 4 grooves that are radially displaced at 90° in the machining head 30 or in the girder 1.

In order to completely decouple the machining head 30 from the machine tool, the machining head 30 is again advanced to a free space in the magazine by axially displacing the machining head 30 in the required manner. Since the machining head 30 sits close to a rear stop after a certain path in the depositing place in the magazine, the further axial movement of the girder 1 causes the axial displacement of the bayonet ring 18 in the adapter ring 25 until the axial nose 24 leaves the axial groove 37. Now the bayonet ring 18 can be rotated into a position by means of the driving spindle 2, so that the bayonet claws 28, 29 are disposed in a gap-to-gap position, as is shown in FIG. 1, and the bayonet ring 18 on the driving spindle 2 can be pulled out from the adapter ring 25 by the axial displacement of the girder 1.

Figure 3:
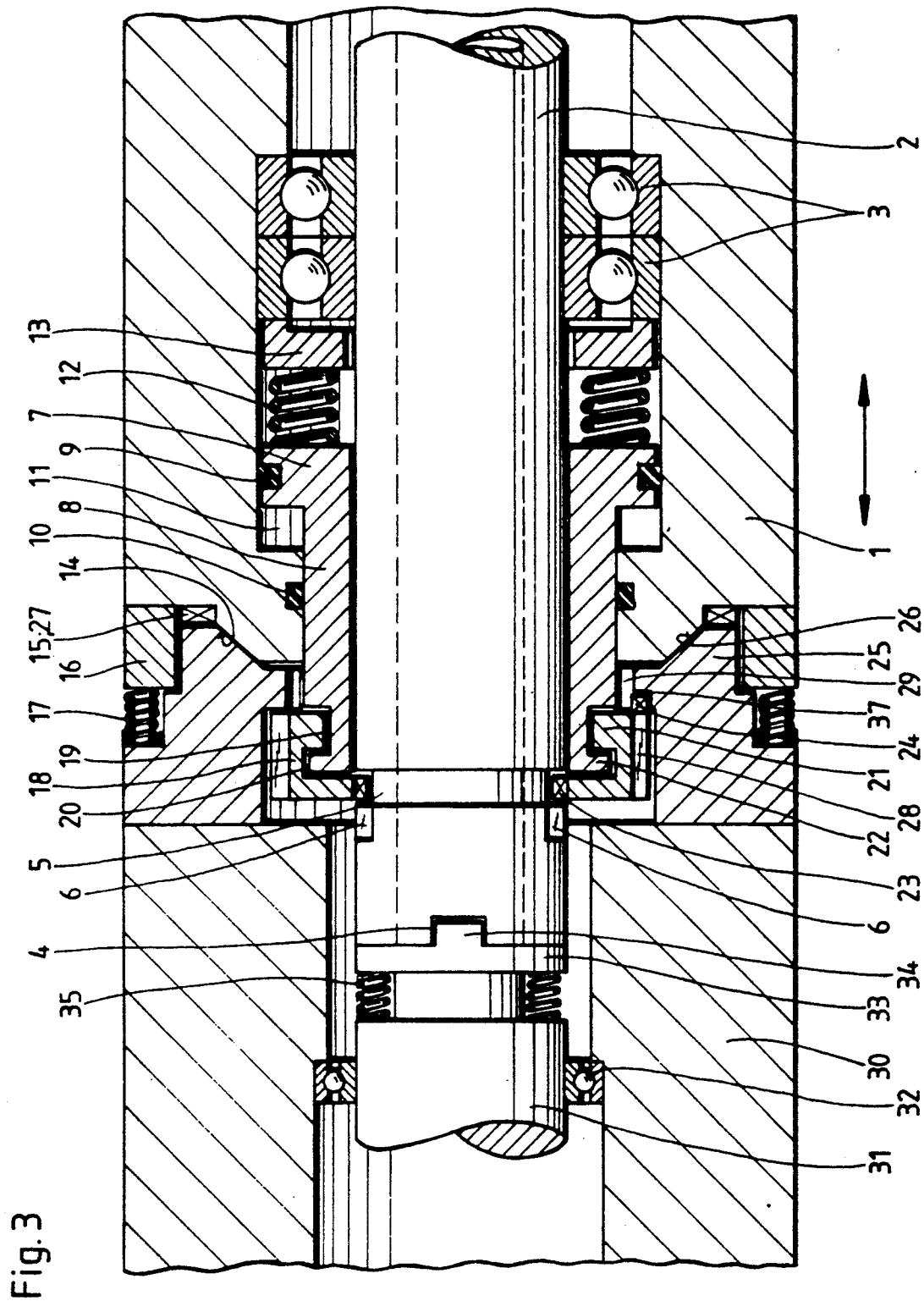
FIG. 3 shows the same view in the locked condition.

The annular piston 7 may also be provided with double action and can be moved into three positions. In this case the one position is equivalent to the position shown in FIG. 1, in which the bayonet ring 18 is torsionally rigidly coupled with the driving spindle 2. In the central position the bayonet ring 18 may be coupled with either the driving spindle 2 or also with the adapter ring 25, as is shown in FIG. 4. However, the axial groove would then require the double length. The third position represents the position as shown in FIG. 3, in which the bayonet ring 18 is no longer in rotational connection with the driving spindle 2.

I claim:

1. Machine tool having a driving spindle rotatably mounted in a carrier; an exchangeable machining head coupleable with said carrier; a tool spindle axially movably and rotatably mounted in said machining head; said tool and driving spindles having confronting axial ends; means on said axial ends which operatively engage each other to form a torsion resistant and axially detachable joint; adjustment and locking means which include at least one hydraulic or pneumatic-piston-cylinder unit operatively mounted on said carrier and driving spindle for detachably locking the machining head onto said carrier; said adjustment and locking means further including a selectively rotatable bayonet ring which has claw means for positively engaging said machining head.

2. Machine tool as claimed in claim 1, wherein said claw means has a bayonet ring operatively mounted on said adjustment and locking means, said claw means including first bayonet claw means operatively mounted between said machine head and said carrier, second bayonet claw means mounted between said bayonet ring and said carrier, and third bayonet claw means mounted between said bayonet ring and said driving spindle; all of said bayonet claw means forming part of said adjustment and locking means.

3. Machine tool as claimed in claim 1, wherein said hydraulic or pneumatic piston-cylinder unit which is provided with an annular piston is guided in said carrier in a sealed manner and arranged coaxially to said driving spindle.

4. Machine tool as claimed in claim 3, wherein said annular piston is movably mounted on said driving spindle, first roller bearing means fixedly mounted in said carrier and on said driving spindle, and first spring means mounted between said first roller bearing means and said annular piston and biasing said annular piston in the direction of the driving spindle end, pressure medium means operatively mounted on said carrier for moving said annular piston in the opposite direction.

5. Machine tool as claimed in claim 4, wherein said bayonet ring is rotatably and axially immovably coupled with said annular piston.

6. Machine tool as claimed in claim 5, wherein said bayonet ring comprises at least one axially oriented projection which is insertable into an axial groove in the driving spindle.

7. Machine tool as claimed in claim 6, wherein said bayonet ring comprises at least one axially oriented projection which is insertable into an axial groove forming part of said second bayonet claw means which is disposed between said bayonet ring and said carrier.

8. Machine tool as claimed in claim 7, wherein said second bayonet claw means include an adapter ring attached thereto.

9. Machine tool as claimed in claim 8, wherein said adapter ring and said carrier comprise cooperating centering cones.

10. Machine tool as claimed in claim 9, wherein said machining head and said carrier comprise radial toothings which cooperate with one another.

11. Machine tool as claimed in claim 10, including second spring means mounted between said carrier and said machining head.

12. Machine tool as claimed in claim 11, including an axially displaceable spring-loaded clutch disk mounted on said tool spindle, said disk is torsionally rigidly coupleable with said tool spindle and coupleable with said driving spindle.

13. Machine tool as claimed in claim 12, wherein said machining head and carrier have mutually confronting axial ends, power docking devices operatively mounted on said mutually confronting axial ends for securely aligning the coupling operation between said machining head and said carrier.

* * * * *